United States Patent
Mikashima (10) Patent No.: US 10,747,138 B2
(45) Date of Patent: Aug. 18, 2020

(54) DATA PROCESSING DEVICE AND IMAGE FORMING APPARATUS FOR IDENTIFYING POSITION OF RECORDING MEDIUM

(71) Applicant: KYOCERA Document Solutions Inc., Osaka-shi, Osaka (JP)

(72) Inventor: Katsuo Mikashima, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/382,434

(22) Filed: Apr. 12, 2019

(65) Prior Publication Data
US 2019/0317423 A1 Oct. 17, 2019

(30) Foreign Application Priority Data

Apr. 17, 2018 (JP) ................. 2018-079160
Mar. 11, 2019 (JP) ................. 2019-043570

(51) Int. Cl.
*G03G 15/04* (2006.01)
*G03G 15/043* (2006.01)
*H04N 1/193* (2006.01)
*H04N 1/00* (2006.01)
*H04N 1/60* (2006.01)

(52) U.S. Cl.
CPC ....... *G03G 15/043* (2013.01); *H04N 1/00018* (2013.01); *H04N 1/00034* (2013.01); *H04N 1/00076* (2013.01); *H04N 1/1938* (2013.01); *H04N 1/6086* (2013.01)

(58) Field of Classification Search
USPC .......................................................... 399/32
See application file for complete search history.

(56) References Cited

U.S. PATENT DOCUMENTS

| | | | | | |
|---|---|---|---|---|---|
| 4,912,491 | A | * | 3/1990 | Hoshino | H04N 1/047 347/116 |
| 4,956,651 | A | * | 9/1990 | Emori | G03G 15/326 346/134 |
| 2010/0239278 | A1 | * | 9/2010 | Sendo | G03G 15/043 399/43 |
| 2013/0277909 | A1 | * | 10/2013 | Ino | B65H 7/10 271/228 |
| 2016/0202628 | A1 | * | 7/2016 | Shoji | G03G 15/556 358/1.1 |

FOREIGN PATENT DOCUMENTS

JP 2004228654 A 8/2004

\* cited by examiner

*Primary Examiner* — Quana Grainger
(74) *Attorney, Agent, or Firm* — Alleman Hall Creasman & Tuttle LLP (57) ABSTRACT

A data acquiring portion acquires a plurality of pieces of second data having different levels depending on amounts of light incident on the light reception portions upon reception of a specific linear light having a specific amount of light. A level acquiring portion acquires a maximum level and a minimum level from among the levels of the plurality of pieces of second data. A characteristic data storage portion preliminarily stores characteristic data that indicates levels of the plurality of pieces of second data. A light amount deriving portion executes a light amount deriving process to derive a set light amount of the linear light based on a threshold, the maximum level, the minimum level, and the characteristic data. A second light emission control portion causes the light emission portion to emit linear light having the set light amount.

8 Claims, 10 Drawing Sheets

DATA PROCESSING DEVICE AND IMAGE FORMING APPARATUS FOR IDENTIFYING POSITION OF RECORDING MEDIUM

INCORPORATION BY REFERENCE

This application is based upon and claims the benefit of priority from the corresponding Japanese Patent Application No. 2018-079160 filed on Apr. 17, 2018, and Japanese Patent Application No. 2019-043570 filed on Mar. 11, 2019, the entire contents of which are incorporated herein by reference.

BACKGROUND

The present disclosure relates to a data processing device for identifying a position of a recording medium in a conveyance path, and to an image forming apparatus including the data processing device.

In an image forming apparatus, a light source and a plurality of light reception portions may be provided at a conveyance path in which an unprinted recording medium is conveyed. The light source emits linear light extending in a main scanning direction toward the recording medium that is being conveyed in the conveyance path. The plurality of light reception portions face the light source across the conveyance path, and receive the linear light that has transmitted through the recording medium. The plurality of light reception portions output data that indicates the amounts of light incident on the light reception portions themselves, to a data processing device such as a CPU. The data is output in the main scanning direction one line by one line in sequence. The data processing device performs shading correction on the input data.

SUMMARY

A data processing device according to an aspect of the present disclosure includes a binarization portion, a position identifying portion, a first light emission control portion, a data acquiring portion, a level acquiring portion, a characteristic data storage portion, a light amount deriving portion, and a second light emission control portion. The binarization portion generates binarization data by performing a binarization process on a plurality of pieces of first data using a predetermined threshold, the plurality of pieces of first data being acquired from a plurality of light reception portions and having different levels depending on amounts of light incident on the plurality of light reception portions upon reception of linear light that was emitted from a light emission portion toward a recording medium that was being conveyed. The position identifying portion identifies a position of the recording medium based on the binarization data. The first light emission control portion causes the light emission portion to emit specific linear light having a specific amount of light at a timing when no recording medium is conveyed. The data acquiring portion acquires a plurality of pieces of second data from the plurality of light reception portions, the plurality of pieces of second data having different levels depending on amounts of light incident on the plurality of light reception portions upon reception of the specific linear light. The level acquiring portion acquires a maximum level and a minimum level from among the levels of the plurality of pieces of second data. The characteristic data storage portion preliminarily stores characteristic data that indicates levels of the plurality of pieces of second data in association with an amount of linear light emitted from the light emission portion toward the recording medium when no foreign substance is adhered to the light emission portion or the plurality of light reception portions. The light amount deriving portion executes a light amount deriving process to derive a set light amount of the linear light based on the threshold, the maximum level, the minimum level, and the characteristic data. The second light emission control portion causes the light emission portion to emit linear light having the set light amount.

An image forming apparatus according to another aspect of the present disclosure includes a light emission portion, a plurality of light reception portions, a binarization portion, a position identifying portion, an image forming portion, a first light emission control portion, a data acquiring portion, a level acquiring portion, a characteristic data storage portion, a light amount deriving portion, and a second light emission control portion. The light emission portion emits linear light toward a recording medium that is being conveyed. The plurality of light reception portions output a plurality of pieces of first data that have different levels depending on amounts of light incident on the plurality of light reception portions upon reception of the linear light. The binarization portion generates binarization data by performing a binarization process on the plurality of pieces of first data using a predetermined threshold. The position identifying portion identifies a position of the recording medium based on the binarization data. The image forming portion forms an image on the recording medium based on the position. The first light emission control portion causes the light emission portion to emit specific linear light having a specific amount of light at a timing when no recording medium is conveyed. The data acquiring portion acquires a plurality of pieces of second data from the plurality of light reception portions, the plurality of pieces of second data having different levels depending on amounts of light incident on the plurality of light reception portions upon reception of the specific linear light. The level acquiring portion acquires a maximum level and a minimum level from among the levels of the plurality of pieces of second data. The characteristic data storage portion preliminarily stores characteristic data that indicates levels of the plurality of pieces of second data in association with an amount of linear light emitted from the light emission portion toward the recording medium when no foreign substance is adhered to the light emission portion or the plurality of light reception portions. The light amount deriving portion derives a set light amount of the linear light based on the threshold, the maximum level, the minimum level, and the characteristic data. The second light emission control portion causes the light emission portion to emit linear light having the set light amount.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 1:
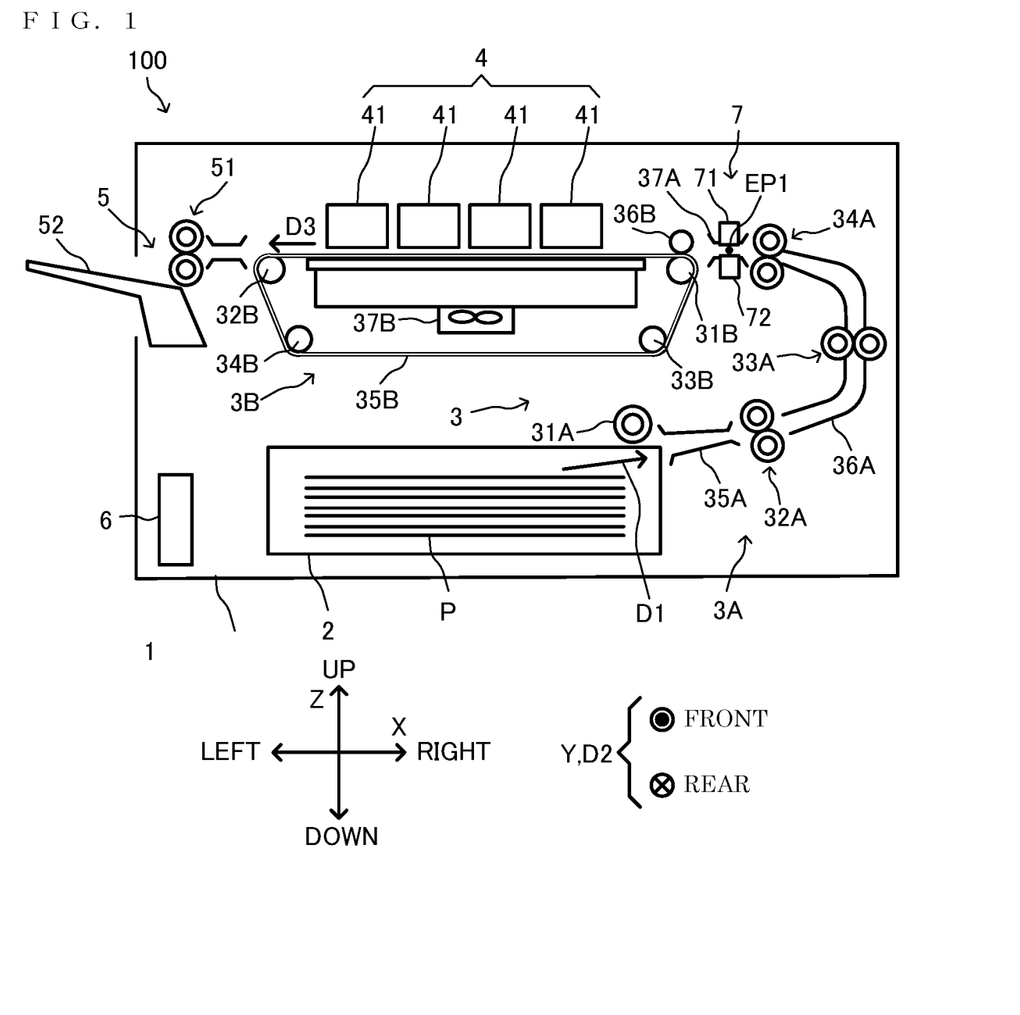
FIG. 1 is a schematic diagram showing a configuration of an image forming apparatus according to an embodiment of the present disclosure.

In FIG. 1, the arrows X, Y, and Z respectively indicate the left-right direction, the front-rear direction, and the up-down direction of an image forming apparatus 100.

In FIG. 1, the image forming apparatus 100 is a copier, a printer, a facsimile apparatus, a multifunction peripheral or the like. The multifunction peripheral has a plurality of functions such as a copy function, a print function, and a facsimile function.

Specifically, the image forming apparatus 100 is an inkjet printer, and forms an image on a recording medium P by an inkjet system using ink, based on image data. The image data is transmitted from, for example, an information processing apparatus that is communicably connected with the image forming apparatus 100. The image data may be transmitted from an image reading device (not shown) included in the image forming apparatus 100. It is noted that not only limited to the inkjet system, the image forming apparatus 100 may form an image by an electrophotographic system, on the recording medium P using toner based on the image data.

The image forming apparatus 100 includes a housing 1, a medium storage portion 2, a conveyance portion 3, an image forming portion 4, a discharge portion 5, a control portion 6, and a light detection portion 7.

The housing 1 includes an exterior body and a frame of the image forming apparatus 100. The housing 1 stores the medium storage portion 2, the conveyance portion 3, and the image forming portion 4.

The medium storage portion 2 is a sheet feed cassette. The medium storage portion 2 is provided in a lower portion of the housing 1. The medium storage portion 2 is attached to the housing 1 in a state where it can be inserted to and removed from the housing 1 in the front-rear direction. The medium storage portion 2 is configured to store a stack of unprinted recording mediums P. The recording medium P has a rectangular main surface on which an image is formed. The recording mediums P are stacked in the medium storage portion 2 such that a first side of the main surface is perpendicular to a conveyance direction D1 of the recording medium P. It is noted that in the following description, a direction parallel to the first side is referred to as a main scanning direction D2. In the present embodiment, the conveyance direction D1 is parallel to the left-right direction, and the main scanning direction D2 is parallel to the front-rear direction.

The medium storage portion 2 is configured to store a plurality of types of recording mediums P that have different light transmittances. Specifically, the plurality of types of recording mediums P include plain paper, recycled paper, thin paper, and thick paper that have different basis weights. It is noted that when the color of the recording mediums P is white, the light transmittances are determined by the basis weights of the recording mediums P.

In addition, the medium storage portion 2 is configured to store recording mediums P of different sizes whose first sides have different lengths.

The conveyance portion 3 includes an upstream-side conveyance portion 3A and a downstream-side conveyance portion 3B.

The upstream-side conveyance portion 3A includes a pickup roller 31A, a separation roller pair 32A, a conveyance roller pair 33A, a registration roller pair 34A, a first guide portion 35A, a conveyance path 36A, and a second guide portion 37A.

The pickup roller 31A, the separation roller pair 32A, the conveyance roller pair 33A, the registration roller pair 34A, the first guide portion 35A, the conveyance path 36A, and the second guide portion 37A are each formed to be longer than the maximum length of the first side in the main scanning direction D2. Rollers included in the pickup roller 31A, the separation roller pair 32A, the conveyance roller pair 33A, and the registration roller pair 34A are each cylindrical.

The upstream-side conveyance portion 3A picks up the recording mediums P one by one from the medium storage portion 2, and feeds them to the first guide portion 35A. Each recording medium P is conveyed in the first guide portion 35A, the conveyance path 36A, and the second guide portion 37A toward the image forming portion 4. The first guide portion 35A, the conveyance path 36A, and the second guide portion 37A are an example of a conveyance path of the present disclosure. In the upstream-side conveyance portion 3A, the recording medium P is guided by the separation roller pair 32A and the conveyance roller pair 33A to the registration roller pair 34 that is provided above the medium storage portion 2, separately therefrom. The recording medium P abuts on the registration roller pair 34A and temporarily stops there. The registration roller pair 34A starts to rotate under the control of the control portion 6, and feeds the recording medium P to the second guide portion 37A that is provided between the upstream-side conveyance portion 3A and the downstream-side conveyance portion 3B.

The downstream-side conveyance portion 3B is provided above the medium storage portion 2 in the housing 1, separately therefrom. The downstream-side conveyance portion 3B is provided on the left side of the second guide portion 37A. The downstream-side conveyance portion 3B includes a tension roller 31B, a driving roller 32B, a first auxiliary roller 33B, a second auxiliary roller 34B, a conveyance belt 35B, an attraction roller 36B, and a suction portion 37B.

The tension roller 31B, the driving roller 32B, the first auxiliary roller 33B, the second auxiliary roller 34B, and the attraction roller 36B are each formed to be cylindrical and longer than the maximum length of the first side in the main scanning direction D2.

The tension roller 31B is provided on the left side of the second guide portion 37A, separately therefrom. The driving roller 32B is provided on the left side of the tension roller 31B, separately therefrom. The upper end positions of the tension roller 31B and the driving roller 32B roughly match the vertical position of a nip formed by the registration roller pair 34A.

The first auxiliary roller 33B is provided on the lower left side of the tension roller 31B, separately therefrom. The second auxiliary roller 34B is provided on the left side of the first auxiliary roller 33B, separately therefrom, and is provided on the lower right side of the driving roller 32B, separately therefrom.

The conveyance belt 35B is an endless belt, and has a width that is larger than the maximum length of the first side in the main scanning direction D2. The conveyance belt 35B is stretched between the tension roller 31B, the driving roller 32B, the first auxiliary roller 33B, and the second auxiliary roller 34B. A lot of through holes (not shown) are formed in the conveyance belt 35B over the whole region along the perimeter direction thereof, the through holes passing through the conveyance belt 35B from the outer perimeter surface side to the inner perimeter surface side.

The driving roller 32B rotates under the control of the control portion 6. The rotation of the driving roller 32B causes the conveyance belt 35B to run in circle. The tension roller 31B, the first auxiliary roller 33B, and the second auxiliary roller 34B rotate following the running of the conveyance belt 35B. The conveyance belt 35B runs in a direction (hereinafter referred to as a running direction D3) indicated by the arrow D3 in FIG. 1 between the upper ends of the tension roller 31B and the driving roller 32B. The running direction D3 is parallel to the left-right direction and is directed from the registration roller pair 34A to a discharge roller pair 51 (namely, leftward).

The attraction roller 36B is disposed to face the tension roller 31B across the conveyance belt 35B and abut on the outer perimeter surface of the conveyance belt 35B from above. The recording medium P that has passed through the second guide portion 37A is fed into between the attraction roller 36B and the conveyance belt 35B. The attraction roller 36B presses the recording medium P against the outer perimeter surface of the conveyance belt 35B and feeds the recording medium P toward the downstream in the running direction D3.

The suction portion 37B is disposed directly below the inner perimeter surface of the conveyance belt 35B between the attraction roller 36B and the driving roller 32B. The suction portion 37B sucks air through the lot of through holes of the conveyance belt 35B. This allows the recording medium P to be conveyed in a state of being in close contact with the outer perimeter surface of the conveyance belt 35B, from the attraction roller 36B toward the downstream in the running direction D3. It is noted that the suction portion 37B may electrostatically attract the recording medium P to cause it to be in close contact with the conveyance belt 35B.

The image forming portion 4 includes four recording heads 41. The four recording heads 41 correspond to a plurality of predetermined colors. The predetermined colors are black, cyan, magenta, and yellow. It is noted that the number of recording heads 41 may be one or more.

Each of the recording heads 41 has a box shape whose length in the main scanning direction D2 is larger than the maximum length of the first side. The recording heads 41 are arranged in alignment along the left-right direction above the suction portion 37B across the conveyance belt 35B. The recording heads 41 are disposed separately from the outer perimeter surface of the conveyance belt 35B. A lot of nozzles for ejecting ink are arranged in alignment along the main scanning direction D2 at a lower end portion of each of the recording heads 41.

The recording medium P is conveyed toward the downstream in the running direction D3 by the conveyance belt 35B that runs directly below the recording heads 41. The recording heads 41 are driven by the control portion 6 and eject ink of the respective colors toward the recording medium P when the recording medium P passes directly below them. In this way, the image forming portion 4 forms an image on the recording medium P based on the image data by using the four recording heads 41.

It is noted that as an ink ejection system of the recording heads 41, a piezo system or a thermal system can be adopted, wherein in the piezo system, piezo elements are used to eject ink, and in the thermal system, air bubbles are generated by heating to eject ink.

The discharge portion 5 includes the discharge roller pair 51 and a discharge tray 52, and discharges, as a print, a recording medium P on which an image has been formed, from the housing 1 to outside the image forming apparatus 100.

The control portion 6 is an example of a data processing device of the present disclosure. The control portion 6 includes a CPU, a ROM, a RAM, and a nonvolatile memory, executes a program stored in the ROM or the like to comprehensively control the image forming apparatus 100 forming an image on a recording medium P. It is noted that the control portion 6 may include, instead of the CPU, an electronic circuit such as a microcontroller, an ASIC (Application Specific Integrated Circuit), or a DSP (Digital Signal Processor).

The light detection portion 7 is a light transmissible type CIS (Contact Image Sensor), and includes a light emission portion 71 and a plurality of light reception portions 72.

The light emission portion 71 and the plurality of light reception portions 72 are provided in the conveyance path (namely, the first guide portion 35A, the conveyance path 36A, and the second guide portion 37A) of the recording medium P at positions close to the image forming portion 4. This makes it possible to reduce the distance between the light detection portion 7 and the image forming portion 4, and reduce a deviation of the recording medium P in the main scanning direction D2. With this configuration, the image forming portion 4 can form an image accurately based on a position identified by a position identifying portion 6I1.

Specifically, the light emission portion 71 and the plurality of light reception portions 72 are provided at the second guide portion 37A. In the second guide portion 37A, a light irradiation place EP1 extending in the main scanning direction D2 is set. The light emission portion 71 and the plurality of light reception portions 72 are disposed at the second guide portion 37A to face each other across the light irradiation place EP1 in the up-down direction.

The light emission portion 71 is formed in the shape of a bar elongated in the main scanning direction D2. The light emission portion 71 generates linear light that is longer than the maximum length of the first side in the main scanning direction D2, and emits the linear light toward the light irradiation place EP1. When the conveyed recording medium P is passing through the second guide portion 37A, the recording medium P receives the linear light emitted from the light emission portion 71. Most of the linear light transmits through the recording medium P and enters the plurality of light reception portions 72.

It is noted that the light emission portion 71 may be an array of light emitting elements arranged in alignment along a front-rear direction Y. Alternatively, the light emission portion 71 may include a light transmission body that extends in the front-rear direction Y, and two light emitting elements that are respectively provided at two ends of the light transmission body in the front-rear direction Y.

The plurality of light reception portions 72 are, for example, a plurality of photodiodes arranged along the main scanning direction D2. The plurality of light reception portions 72 receive the linear light via an array of lenses of the refractive index distribution type (not shown). The plurality of light reception portions 72 generate a plurality of pieces of first data that have different levels depending on the amounts of light incident on them upon reception of the linear light, and output the plurality of pieces of first data to the control portion 6.

Meanwhile, in the image forming apparatus 100, the control portion 6 identifies a position of the recording medium P in the main scanning direction D2, in the conveyance path (hereinafter, the position is referred to as a "main scanning direction position"), and adjusts a position in the main scanning direction D2 of the image to be formed on the recording medium P. To adjust the position of the image in the main scanning direction D2, the first data subjected to a so-called shading correction, may be used. However, to perform the shading correction, reference data that indicates a reference value of a specific color (white, black or the like), is required. The secular change of the light emission portion 71 and the plurality of light reception portions 72 taken into consideration, the reference data is preferably generated by using a reference plate colored by the specific color after the user side starts operating the image forming apparatus 100, not before the shipment of the image forming apparatus 100.

However, if some foreign substance (for example, dust or paper powder) adheres to the light emission portion 71 and the plurality of light reception portions 72 after the image forming apparatus 100 is started operating, the accuracy of the reference data is reduced. When this happens, the control portion 6 may not be able to accurately identify the main scanning direction position of the recording medium P in the conveyance path.

Figure 2:
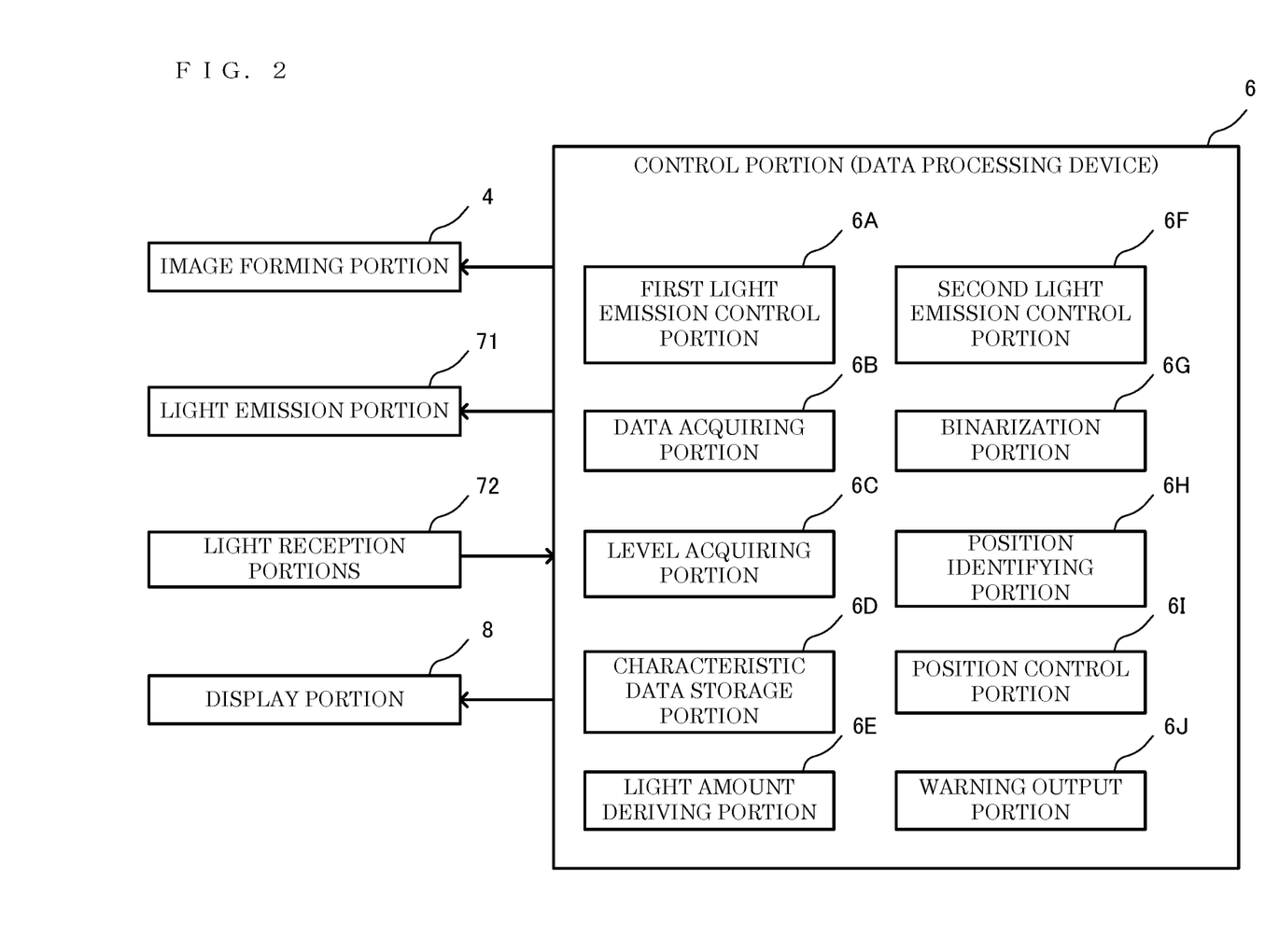
FIG. 2 is a block diagram showing a main part of the image forming apparatus.

On the other hand, the image forming apparatus 100 can accurately identify the position of an unprinted recording medium P in the conveyance path. Specifically, the control portion 6 does not perform the shading correction on the first data to identify the main scanning direction position of the recording medium P, but executes the following process. For this purpose, as shown in FIG. 2, the image forming apparatus 100 further includes a display portion 8. In addition, the control portion 6 includes a first light emission control portion 6A, a data acquiring portion 6B, a level acquiring portion 6C, a characteristic data storage portion 6D, a light amount deriving portion 6E, a second light emission control portion 6F, a binarization portion 6G, the position identifying portion 6H, a position control portion 6I, and a warning output portion 6J. Specifically, the control portion 6 functions as the first light emission control portion 6A, the data acquiring portion 6B, the level acquiring portion 6C, the characteristic data storage portion 6D, the light amount deriving portion 6E, the second light emission control portion 6F, the binarization portion 6G, the position identifying portion 6H, the position control portion 6I, and the warning output portion 6J by executing the program.

In FIG. 2, the display portion 8 is, for example, a liquid crystal display, and displays information indicating that a binarization process executed by the binarization portion 6G has resulted in an error, based on warning data (described in detail below) output from the warning output portion 6J.

The first light emission control portion 6A causes the light emission portion 71 to emit specific linear light having a specific amount of light at a timing when no recording medium P is conveyed in the conveyance path. The timing is preferably immediately after activation of the image forming apparatus 100. The immediately after activation is either immediately after a power-on of the image forming apparatus 100 or immediately after the image forming apparatus 100 has returned from the sleep mode. This makes it possible to restrict the process of the light amount deriving portion 6E from affecting the productivity of the image forming apparatus 100. The productivity is, for example, the number of prints output per unit time. It is noted that the timing is not limited to immediately after activation, but may be after the image forming portion 4 has formed an image on a recording medium P and before it forms an image on the next recording medium P.

The data acquiring portion 6B acquires a plurality of pieces of second data from the plurality of light reception portions 72, wherein the plurality of pieces of second data have different levels depending on the amounts of light incident on the plurality of light reception portions 72 upon reception of the specific linear light. Here, when some foreign substance has adhered to the light emission portion 71 or the plurality of light reception portions 72, the light incident on the plurality of light reception portions 72 is reduced due to the foreign substance. Thus the levels of the plurality of pieces of second data correlate to the amount of adhered foreign substance. Specifically, the larger the amount of adhered foreign substance is, the smaller the levels are.

The level acquiring portion 6C acquires a maximum level and a minimum level from among the levels of the plurality of pieces of second data.

The characteristic data storage portion 6D is the nonvolatile memory included in the control portion 6. The characteristic data storage portion 6D preliminarily stores characteristic data that indicates levels of the plurality of pieces of second data in association with an amount of the linear light emitted from the light emission portion 71 toward the recording medium P when no foreign substance is adhered to the light emission portion 71 or the plurality of light reception portions 72. Specifically, the characteristic data is stored in the nonvolatile memory before the shipment of the image forming apparatus 100 (for example, at the production stage).

After the user side starts operating the image forming apparatus 100, the light emission portion 71, under the control of the control portion 6, emits the linear light toward any one of the plurality of types of recording mediums P that have different light transmittances. The light transmittances are preliminarily defined as described above. The characteristic data preferably indicates levels of the plurality of pieces of second data in association with an amount of the linear light emitted from the light emission portion 71 toward a type of recording medium P having the maximum light transmittance. This is because, in a case where the characteristic data indicates levels of the plurality of pieces of second data in association with an amount of the linear light emitted from the light emission portion 71 toward a type of recording medium P that does not have the maximum light transmittance, when the linear light is emitted toward a type of recording medium P having the maximum light transmittance, the binarization process is apt to result in an error.

The light amount deriving portion 6E executes a light amount deriving process to derive a set light amount of the linear light based on: a threshold used in the binarization portion 6G; the maximum level; the minimum level; and the characteristic data.

The second light emission control portion 6F causes the light emission portion 71 to emit linear light having the set light amount.

The linear light is emitted toward the recording medium P when it is conveyed in the conveyance path. The binarization portion 6G acquires, from the plurality of light reception portions 72, a plurality of pieces of first data that have different levels depending on the amounts of light incident on the plurality of light reception portions 72 upon reception of the linear light. The binarization portion 6G generates the binarization data by performing the binarization process on the plurality of pieces of first data using a predetermined threshold T1.

The position identifying portion 6H identifies the position of the recording medium P based on the binarization data. Specifically, the position is a position of the recording medium P in the main scanning direction at the light irradiation place EP1 (see FIG. 1) in the conveyance path.

The position control portion 6I corrects the image data based on the identified position to adjust the position at which the image is to be formed on the recording medium P. The position control portion 6I drives the image forming portion 4 based on the corrected image data. This allows the image forming portion 4 to form an image on the recording medium P based on the position identified by the position identifying portion 6H.

In a case where the light amount deriving portion 6E cannot derive the set light amount of the linear light, the warning output portion 6J outputs warning data indicating that the light amount deriving process has resulted in an error. The warning data is preliminarily stored in the nonvolatile memory or the like. The display portion 8 displays, based on the warning data, that the light amount deriving process has resulted in an error, to notify the user thereof.

In the following, a processing procedure of the control portion 6 (the data processing device) is described in detail with reference to FIG. 3 to FIG. 10.

Figure 3:
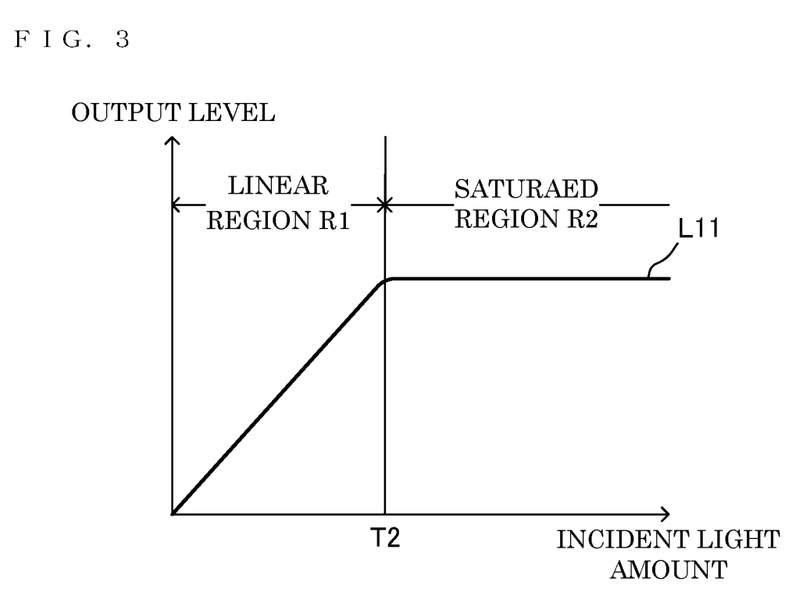
FIG. 3 is a schematic diagram showing input/output characteristics of a plurality of light reception portions.

FIG. 3 shows an input/output characteristic curve L11 of the plurality of light reception portions 72. The input/output characteristic curve L11 is divided into a linear region R1 and a saturated region R2. The linear region R1 is defined by the incident light amount ranging from 0 (zero) to a predetermined light amount threshold T2. The saturated region R2 is defined by the incident light amount exceeding the light amount threshold T2. In the linear region R1, the output level of the plurality of light reception portions 72 is proportional to the incident light amount. On the other hand, in the saturated region R2, the output level of the plurality of light reception portions 72 is constant to the incident light amount.

Figure 4:
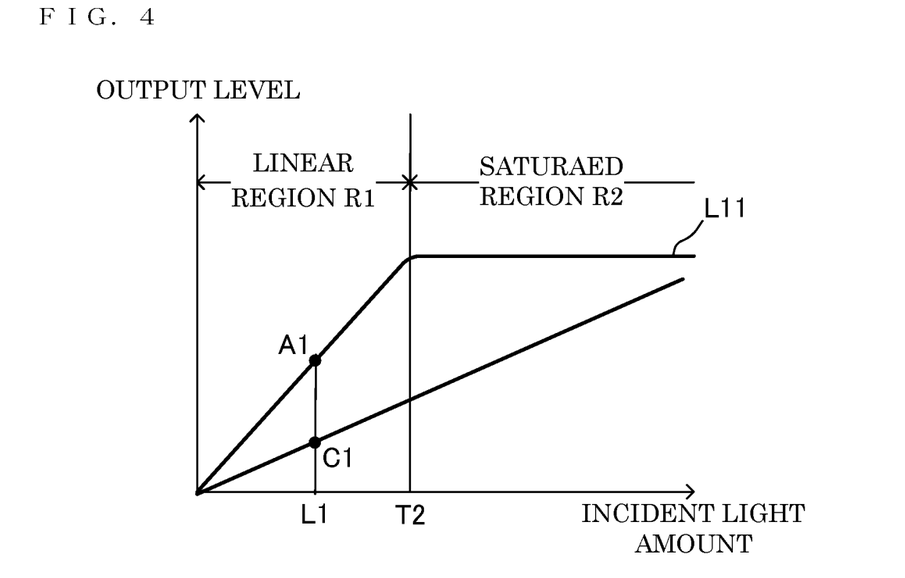
FIG. 4 is a schematic diagram showing characteristic data stored in a characteristic data storage portion shown in FIG. 2.

FIG. 4 shows an output reduction ratio K that is preliminarily stored in the characteristic data storage portion 6D. The output reduction ratio K is determined based on an experiment or a simulation performed before the shipment of the image forming apparatus 100. Specifically, in a state where no foreign substance has adhered to the light emission portion 71 and the plurality of light reception portions 72, experimenters operate the image forming apparatus 100 to emit specific linear light having a specific light amount L1 toward a type of recording medium P that has the maximum light transmittance, wherein the specific light amount L1 is included in the linear region R1 of the input/output characteristic curve L11. The experimenters measure the levels of a plurality of pieces of second data output from the plurality of light reception portions 72. The experimenters obtains a level C1 as a representative of the measured levels. The level C1 is a level of the plurality of pieces of second data corresponding to the specific light amount L1, and is, for example, an average value of the measured levels. Not limited to this, the level C1 may be a level of the second data output from a specific light reception portion 72 among the plurality of light reception portions 72.

In addition, the experimenters derive a level A1 corresponding to the specific light amount L1 from the input/output characteristic curve L11. The level A1 is a level of the plurality of pieces of second data output from the plurality of light reception portions 72 when no recording medium P is conveyed in the conveyance path.

The experimenters further obtain K=C1/A1, and store it in the nonvolatile memory. The "K" is an example of characteristic data of the present disclosure. Specifically, "K" represents a reduction ratio of the plurality of pieces of second data output from the plurality of light reception portions 72 with respect to the type of recording medium P that has the maximum light transmittance.

Figure 5:
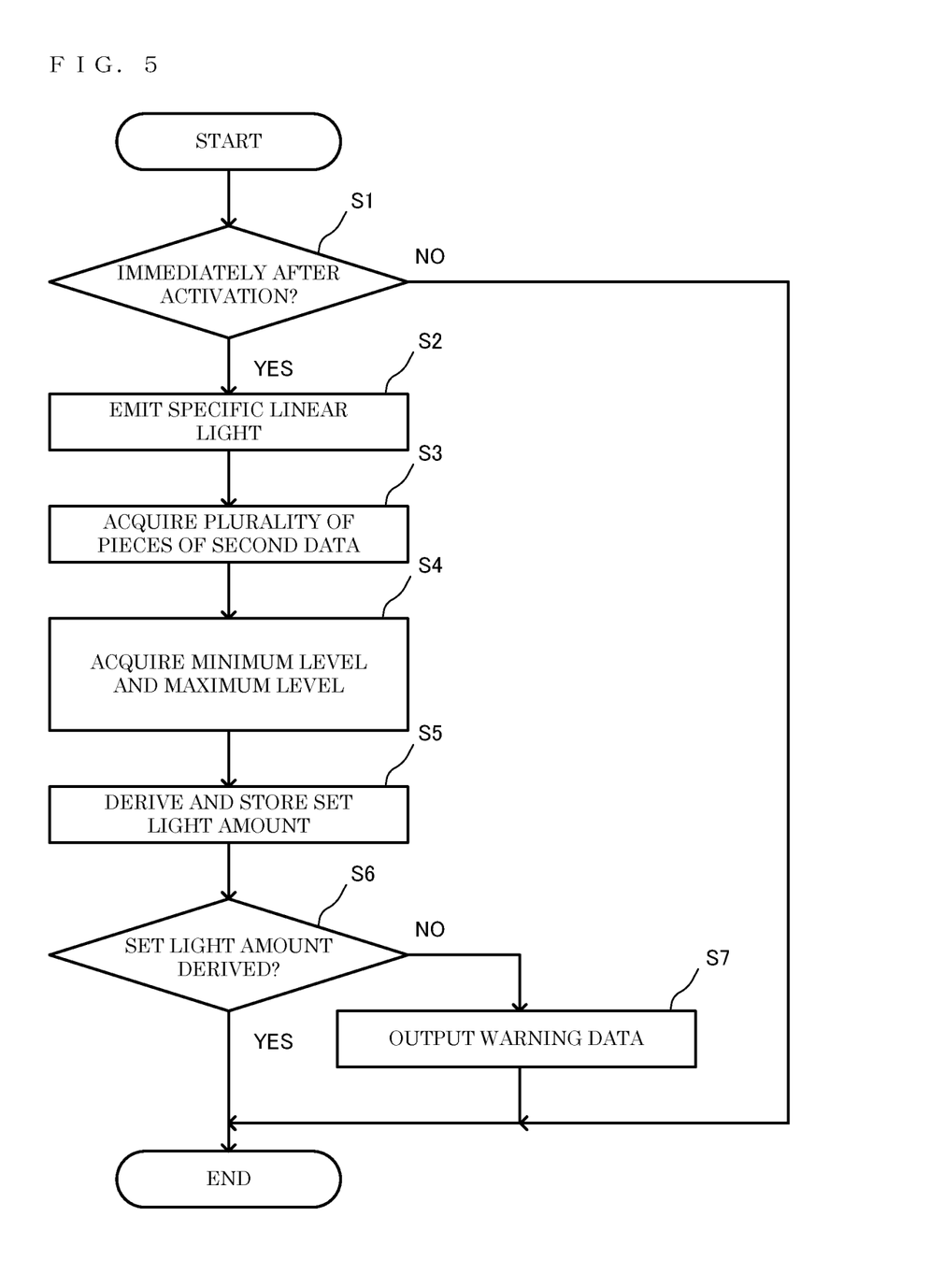
FIG. 5 is a flowchart showing a procedure of a light amount deriving process in which a control portion shown in FIG. 2 derives a set light amount.

FIG. 5 is a flowchart showing a procedure of a process executed by the control portion 6 to derive and store the set light amount. In FIG. 5, the control portion 6 determines whether or not the image forming apparatus 100 is immediately after activation thereof (step S1). Specifically, the control portion 6 determines that the image forming apparatus 100 is immediately after activation when the image forming apparatus 100 is immediately after returning from the sleep mode or immediately after a power-on. Upon determining that the image forming apparatus 100 is not immediately after activation, the control portion 6 ends the process of FIG. 5. On the other hand, upon determining that the image forming apparatus 100 is immediately after activation, the control portion 6 moves the process to step S2.

In step S2, recognizing that the image forming apparatus 100 is immediately after activation and thus no recording medium P is conveyed in the conveyance path, the control portion 6 functions as the first light emission control portion 6A. The control portion 6 causes the light emission portion 71 to emit the specific linear light having the specific light amount L1 (step S2), and moves the process to step S3. The specific linear light travels the space in the second guide portion 37A, passes through the light irradiation place EP1 (see FIG. 1), and enters the plurality of light reception portions 72. The plurality of light reception portions 72 output the plurality of pieces of second data to the control portion 6.

In step S3, functioning as the data acquiring portion 6B, the control portion 6 acquires the plurality of pieces of second data, and moves the process to step S4. Here, when some foreign substance has adhered to the plurality of light reception portions 72, levels of the plurality of pieces of second data vary depending on the amount of adhered foreign substance.

In step S4, functioning as the level acquiring portion 6C, the control portion 6 acquires a minimum level B1 and a maximum level B2 (see FIG. 6) from the levels of the plurality of pieces of second data. Thereafter, the control portion 6 moves the process to step S5.

In step S5, functioning as the light amount deriving portion 6E, the control portion 6 performs the light amount deriving process. Specifically, first the control portion 6 reads the output reduction ratio K (a known constant) from the characteristic data storage portion 6D onto the RAM or the like.

Figure 6:
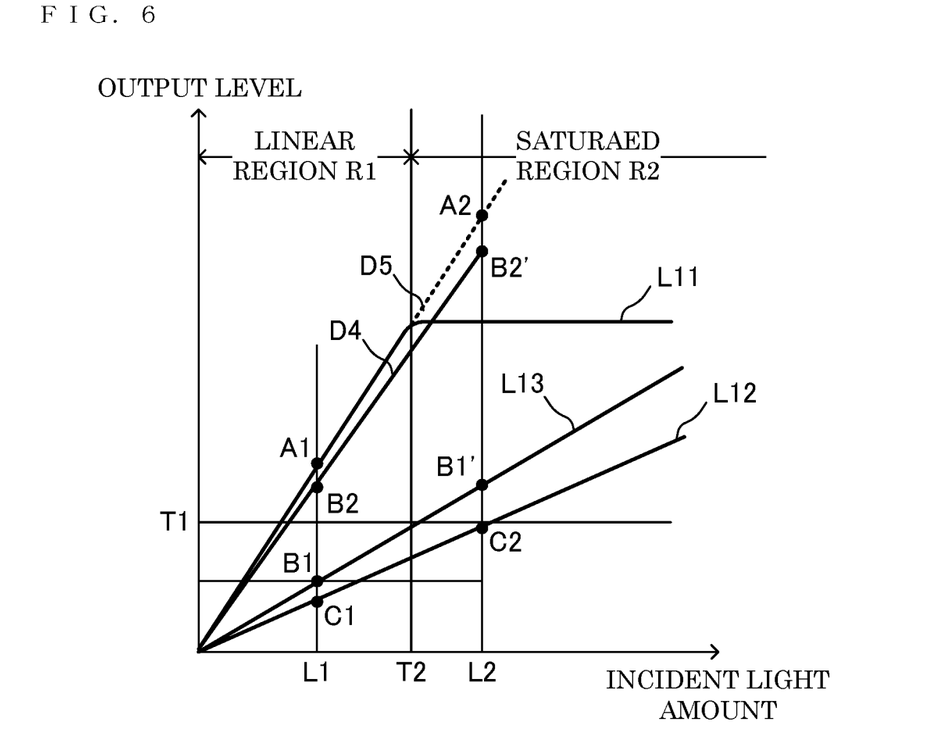
FIG. 6 is a schematic diagram showing the set light amount deriving process shown in FIG. 5.

Here, FIG. 6 shows the minimum level B1, the maximum level B2, and the threshold T1 in addition to the input/output characteristic curve L11 (see FIG. 3), the level A1, and the level C1 (see FIG. 4). FIG. 6 further shows straight lines L12, L13, and D4, wherein the straight line L12 passes through the origin and the level C1, the straight line L13 passes through the origin and the minimum level B1, and the straight line D4 passes through the origin and the maximum level B2.

The minimum level B1 and the maximum level B2 are included in an area between the input/output characteristic curve L11 and the straight line L12. Specifically, the minimum level B1 and the maximum level B2 are on a straight line representing the light amount L1 (namely, the specific light amount L1) in the area. In addition, the minimum level B1 is closer to the straight line L12 than to the input/output characteristic curve L11, and the maximum level B2 is closer to the input/output characteristic curve L11.

Furthermore, L2 shown in FIG. 6 represents the set light amount of the linear light that is derived by the light amount deriving portion 6E. The set light amount L2 is not necessarily included in the linear region R1 of the input/output characteristic curve L11, but may be included in the saturated region R2. In addition, the set light amount L2 cannot be an arbitrary value. Specifically, if the set light amount L2 is too large, there is a possibility that all the plurality of pieces of second data may exceed the threshold T1 in the binarization process executed by the binarization portion 6G even if the recording medium P has passed the light irradiation place EP1. On the other hand, if the set light amount L2 is not large enough, there is a possibility that the foreign substance may not be correctly distinguished from the recording medium P in the binarization process. As a result, the set light amount L2 is defined as satisfying the following conditions. The following describes the conditions for the set light amount L2.

In FIG. 6, the points A1 and C1 are points that are respectively on the input/output characteristic curve L11 and the straight line L12 when the light amount is the specific light amount L1. The output levels indicated by the points A1 and C1 are known. A point A2 is on a straight line D5 passing through the origin and the point A1, and indicates a level corresponding to the set light amount L2. In addition, a point C2 is on the straight line L12, and indicates a level corresponding to the set light amount L2. Here, the point A2 is unknown because there is a possibility that the set light amount L2 may be included in the saturated region R2. The point C2 is also unknown.

The points B1 and B2 respectively represent the minimum level B1 and the maximum level B2 when the light amount is the specific light amount L1. In addition, the points B1' and B2' are respectively on the straight lines L13 and D4, indicating output levels when the light amount is the set light amount L2.

Since, in FIG. 6, the points A1 and A2 are on the straight line D5, and the points C1 and C2 are on the straight line L12, the following equation (1) is established.

$$C1/A1 = C2/A2 = K \quad (1)$$

In addition, B1/B2=B1'/B2' is obtained. Assume that A1 B2, and A2 B2', then the equation (1) can be modified as the following equation (2). It is noted that B2 and B2' can respectively be approximated as A1 and A2 since B2 denotes the maximum level B2 among the plurality of pieces of second data and B2' denotes the maximum level B2' for the set light amount L2.

$$C2 = A2 \times K = (K \times B2 \times B1')/B1 \quad (2)$$

The equation (2) can be modified as the following equation (3).

$$B1' = (C2 \times B1)/(B2 \times K) \quad (3)$$

When the set light amount L2 is such a value that satisfies conditions C2≤T1 and B1'>T1, it does not happen that all the plurality of pieces of second data exceed the threshold T1, even if the recording medium P has passed the light irradiation place EP1, and it is possible to correctly distinguish the foreign substance from the recording medium P in the binarization process.

Specifically, the light amount deriving portion 6E obtains B1' by substituting C2 (satisfying C2<T1) into the equation (3). It is noted that C2 is a known value and is preliminarily recorded in the program or the like. The light amount deriving portion 6E sets one of light amounts satisfying the above-described conditions as the set light amount L2, and stores the set light amount L2 in the RAM or the like (step S5). It is noted that from the viewpoint of saving power consumption, it is preferable that among the light amounts satisfying the conditions, the minimum light amount is set as the set light amount L2. After step S5, the control portion 6 waits for image data to be transmitted. It is noted that in a case where a light amount satisfying the conditions cannot be set as the set light amount L2, a minimum light amount among those satisfying the condition B1'>T1 may be stored in the RAM or the like as the set light amount L2.

Next, the control portion 6 functioning as the light amount deriving portion 6E determines whether or not the set light amount L2 has been derived by the light amount deriving process (step S6). Specifically, in step S6, the control portion 6 determines whether or not the set light amount L2 has been set in step S5. Upon determining that the set light amount L2 has been derived, the control portion 6 ends the process of FIG. 5. On the other hand, when the set light amount L2 has not been set in step S5, it is assumed that some foreign substance has adhered to the light emission portion 71 or the plurality of light reception portions 72, and the control portion 6 moves the process to step S7.

In step S7, functioning as the warning output portion 6J, the control portion 6 outputs the warning data to the display portion 8. The display portion 8 displays the warning data. This allows the user to recognize that some foreign substance has adhered to the light emission portion 71 or the plurality of light reception portions 72. Thereafter, the control portion 6 ends the process of FIG. 5.

Figure 7:
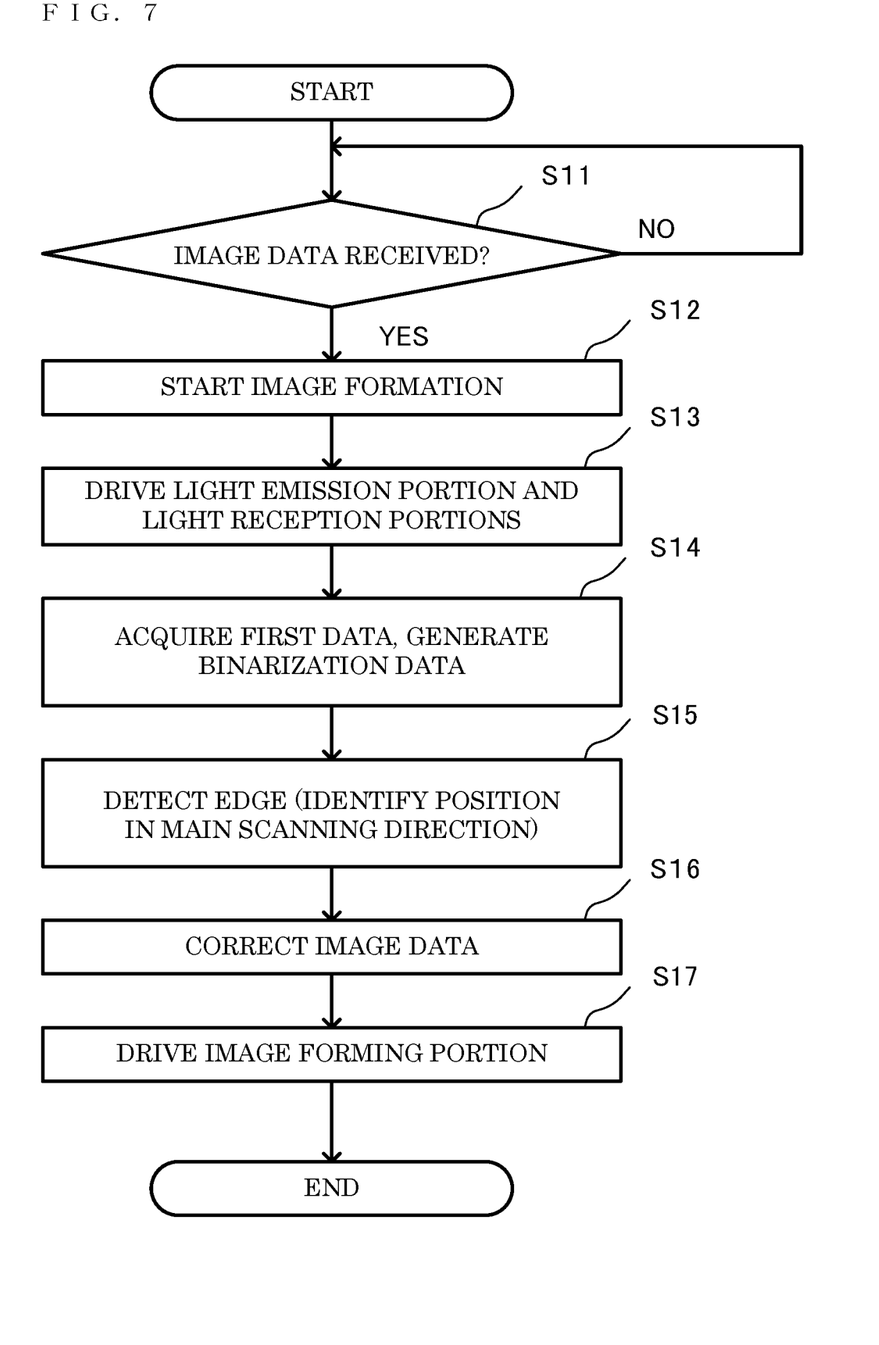
FIG. 7 is a flowchart showing a procedure of an image formation performed by the control portion shown in FIG. 2.

The control portion 6 starts the process of FIG. 7 after ending the process of FIG. 5, and first determines whether or not image data has been received (step S11). Upon determining that image data has not been received, the control portion 6 returns the process to step S11. On the other hand, upon determining that image data has been received, the control portion 6 moves the process to step S12.

The control portion 6 starts the image formation (step S12). During the image formation, the recording mediums P are picked up one by one from the medium storage portion 2, and conveyed in the conveyance path toward the image forming portion 4.

Immediately after step S12, the control portion 6 drives the light emission portion 71 and the plurality of light reception portions 72 (step S13). In step S13, the control portion 6 functions as the second light emission control portion 6F. Specifically, the control portion 6 causes the light emission portion 71 to emit linear light having the set light amount L2 in the RAM, and moves the process to step S14.

In step S14, functioning as the binarization portion 6G, the control portion 6 acquires a plurality of pieces of first data from the plurality of light reception portions 72, and generates binarization data by performing the binarization process on the plurality of pieces of first data using the threshold T1.

In step S15, functioning as the position identifying portion 6H, the control portion 6 detects an edge of the recording medium P in the main scanning direction D2 from the binarization data. Based on the detected edge, the control portion 6 identifies the position of the recording medium P in the main scanning direction D2 at the light irradiation place EP1 in the conveyance path. Here, the control portion 6 may identify a position of a hole (for example, a punched hole) that may be formed in the recording medium P at the light irradiation place EP1 in the conveyance path (step S15). Thereafter, the control portion 6 moves the process to step S16.

In step S16, functioning as the position control portion 6I, the control portion 6 corrects the image data based on the detected position in the main scanning direction, and adjusts the position at which the image is to be formed on the recording medium P. The control portion 6 may perform another correction such as deleting a part corresponding to the position of the hole from the image data. Thereafter, the control portion 6 moves the process to step S17.

In step S17, the control portion 6 drives the image forming portion 4 based on the image data after correction. As a result, an image is formed on the recording medium P based on the image data after correction. Thereafter, the control portion 6 ends the process of FIG. 7.

Figure 8:
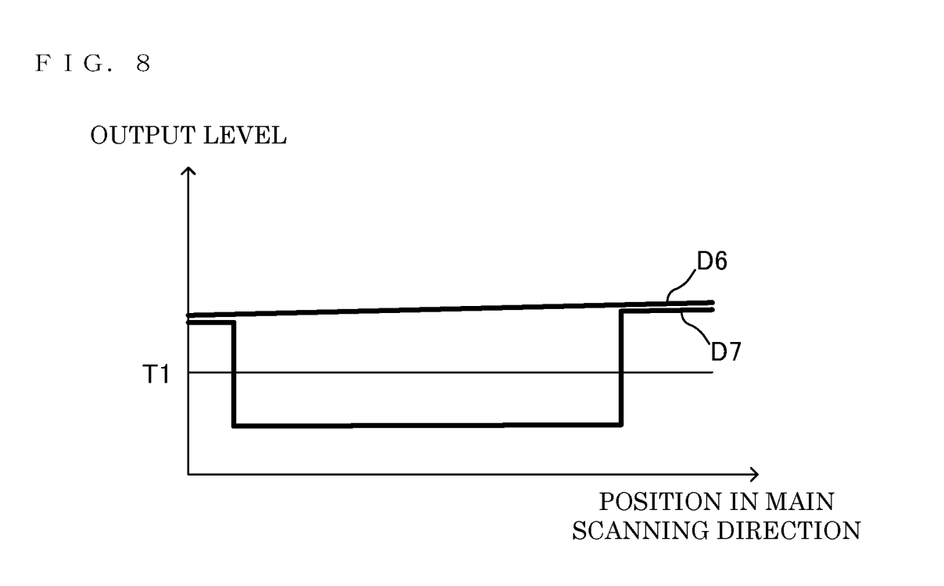
FIG. 8 is a schematic diagram showing second data in a state where no foreign substance is adhered to a light emission portion and a plurality of light reception portions shown in FIG. 5.

As shown in FIG. 8, in a state where no foreign substance is adhered to the light emission portion 71 and the plurality of light reception portions 72, the second data has approximately a constant level in the main scanning direction D2. In this case, the binarization portion 6G can generate the binarization data for identifying the position of the recording medium P in the main scanning direction, by binarizing the first data using a predetermined threshold T1. It is noted that in FIG. 8, a reference sign D6 is assigned to the second data, and a reference sign D7 is assigned to the first data.

Figure 9:
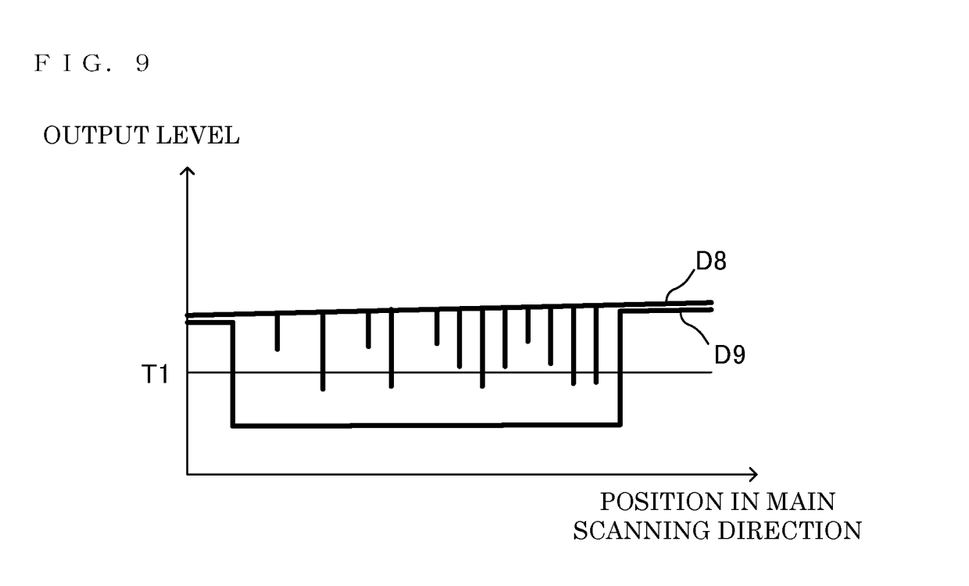
FIG. 9 is a schematic diagram showing the second data (before the set light amount is derived) in a state where foreign substances are adhered to the light emission portion and the plurality of light reception portions shown in FIG. 5.

As shown in FIG. 9, in a state where some foreign substance is adhered to the light emission portion 71 and the plurality of light reception portions 72, the level of the second data is reduced at portions where the foreign substance is adhered. The process of FIG. 5 may not be executed due to the reduction of the level. In that case, even if the binarization portion 6G binarizes the first data using the threshold T1, it may fail to generate the binarization data for identifying the position of the recording medium P in the main scanning direction. It is noted that in FIG. 9, a reference sign D8 is assigned to the second data, and a reference sign D9 is assigned to the first data.

Figure 10:
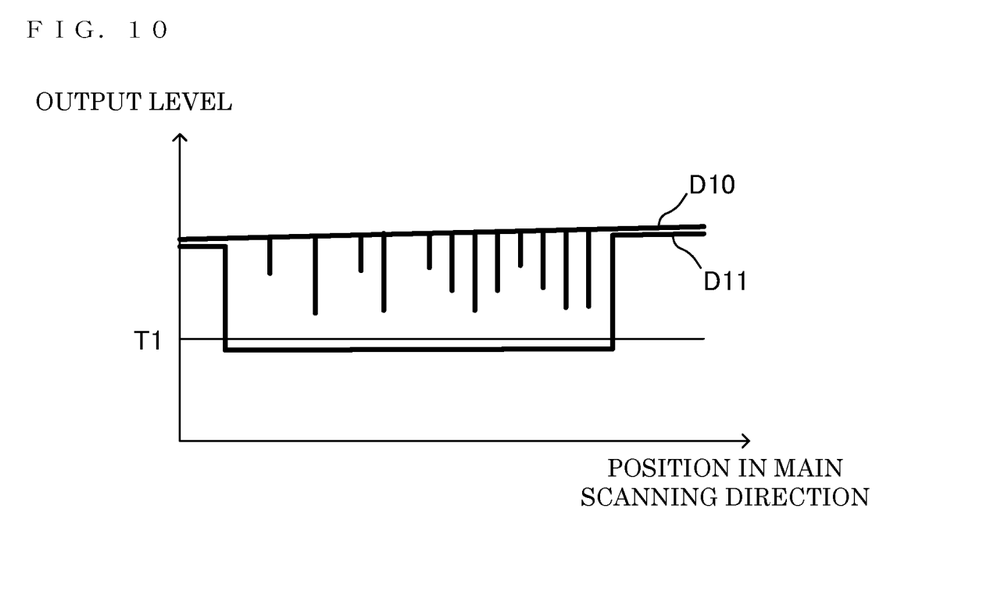
FIG. 10 is a schematic diagram showing the second data (after the set light amount is derived) in the state where foreign substances are adhered to the light emission portion and the plurality of light reception portions shown in FIG. 5.

However, according to the present embodiment, the light amount deriving portion 6E, by executing the process of FIG. 5, derives the set light amount L2 that satisfies the equation (3) when the condition C2<T1 is satisfied, and after an image formation is started, the light emission portion 71 generates linear light having the set light amount L2. Therefore, as shown in FIG. 10, the levels of the second data and the first data increase, whereas the threshold T1 does not change. Specifically, the level of the second data exceeds the threshold T1, but a part of the output level of the first data corresponding to the recording medium P is equal to or lower than the threshold T1. As a result, the binarization portion 6G can generate the binarization data for identifying the position of the recording medium P in the main scanning direction. It is noted that in FIG. 10, a reference sign D10 is assigned to the second data, and a reference sign D11 is assigned to the first data.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A data processing device comprising:
a binarization portion configured to generate binarization data by performing a binarization process on a plurality of pieces of first data using a predetermined threshold, the plurality of pieces of first data being acquired from a plurality of light reception portions and having different levels depending on amounts of light incident on the plurality of light reception portions upon reception of linear light that was emitted from a light emission portion toward a recording medium that was being conveyed;
a position identifying portion configured to identify a position of the recording medium based on the binarization data;
a first light emission control portion configured to cause the light emission portion to emit specific linear light having a specific amount of light at a timing when no recording medium is conveyed;
a data acquiring portion configured to acquire a plurality of pieces of second data from the plurality of light reception portions, the plurality of pieces of second data having different levels depending on amounts of light incident on the plurality of light reception portions upon reception of the specific linear light;
a level acquiring portion configured to acquire a maximum level and a minimum level from among the levels of the plurality of pieces of second data;
a characteristic data storage portion preliminarily storing characteristic data that indicates levels of the plurality of pieces of second data in association with an amount of linear light emitted from the light emission portion toward the recording medium when no foreign substance is adhered to the light emission portion or the plurality of light reception portions;
a light amount deriving portion configured to execute a light amount deriving process to derive a set light amount of the linear light based on the threshold, the maximum level, the minimum level, and the characteristic data; and
a second light emission control portion configured to cause the light emission portion to emit linear light having the set light amount, wherein
the characteristic data is a reduction ratio of the plurality of pieces of second data output from the plurality of light reception portions with respect to the recording medium, and the light amount deriving portion derives the set light amount that satisfies following formulas (1) and (2):

$$C2 \leq T1 \quad (1)$$

$$(C2 \times B1)/(B2 \times K) > T1 \quad (2),$$

wherein in the formulas (1) and (2), T1 denotes the threshold, B1 denotes the minimum level, B2 denotes the maximum level, K denotes the reduction ratio, and C2 denotes a level corresponding to the set light amount.

2. The data processing device according to claim 1, further comprising:
a warning output portion configured to, in a case where the light amount deriving portion cannot derive the set light amount of the linear light, output warning data indicating that the light amount deriving process has resulted in an error.

3. The data processing device according to claim 1, wherein
the light emission portion emits the linear light toward any one of a plurality of types of recording mediums that have different, preliminarily defined light transmittances, and
the characteristic data indicates levels of the plurality of pieces of second data in association with an amount of the linear light emitted from the light emission portion toward a type of recording medium having a maximum light transmittance among the plurality of types of recording mediums.

4. An image forming apparatus comprising:
a light emission portion configured to emit linear light toward a recording medium that is being conveyed;
a plurality of light reception portions configured to output a plurality of pieces of first data that have different levels depending on amounts of light incident on the plurality of light reception portions upon reception of the linear light;
a binarization portion configured to generate binarization data by performing a binarization process on the plurality of pieces of first data using a predetermined threshold;
a position identifying portion configured to identify a position of the recording medium based on the binarization data;
an image forming portion configured to form an image on the recording medium based on the position;
a first light emission control portion configured to cause the light emission portion to emit specific linear light having a specific amount of light at a timing when no recording medium is conveyed;
a data acquiring portion configured to acquire a plurality of pieces of second data from the plurality of light reception portions, the plurality of pieces of second data having different levels depending on amounts of light incident on the plurality of light reception portions upon reception of the specific linear light;
a level acquiring portion configured to acquire a maximum level and a minimum level from among the levels of the plurality of pieces of second data;
a characteristic data storage portion preliminarily storing characteristic data that indicates levels of the plurality of pieces of second data in association with an amount of linear light emitted from the light emission portion toward the recording medium when no foreign substance is adhered to the light emission portion or the plurality of light reception portions;
a light amount deriving portion configured to derive a set light amount of the linear light based on the threshold, the maximum level, the minimum level, and the characteristic data; and
a second light emission control portion configured to cause the light emission portion to emit linear light having the set light amount, wherein
the characteristic data is a reduction ratio of the plurality of pieces of second data output from the plurality of light reception portions with respect to the recording medium, and
the light amount deriving portion derives the set light amount that satisfies following formulas (1) and (2):

$$C2 \leq T1 \quad (1)$$

$$(C2 \times B1)/(B2 \times K) > T1 \quad (2),$$

wherein in the formulas (1) and (2), T1 denotes the threshold, B1 denotes the minimum level, B2 denotes the maximum level, K denotes the reduction ratio, and C2 denotes a level corresponding to the set light amount.

5. The image forming apparatus according to claim 4, further comprising:
a conveyance path in which the recording medium is conveyed toward the image forming portion,
wherein the light emission portion and the plurality of light reception portions are provided in the conveyance path at positions close to the image forming portion.

6. The image forming apparatus according to claim 4, wherein
the timing is immediately after activation of the image forming apparatus.

7. The image forming apparatus according to claim 4, further comprising:
a warning output portion configured to, in a case where the light amount deriving portion cannot derive the set light amount of the linear light, output warning data indicating that the light amount deriving process has resulted in an error.

8. The image forming apparatus according to claim 4, wherein
the light emission portion emits the linear light toward any one of a plurality of types of recording mediums that have different, preliminarily defined light transmittances, and
the characteristic data indicates levels of the plurality of pieces of second data in association with an amount of the linear light emitted from the light emission portion toward a type of recording medium having a maximum light transmittance among the plurality of types of recording mediums.

* * * * *